UNITED STATES PATENT OFFICE.

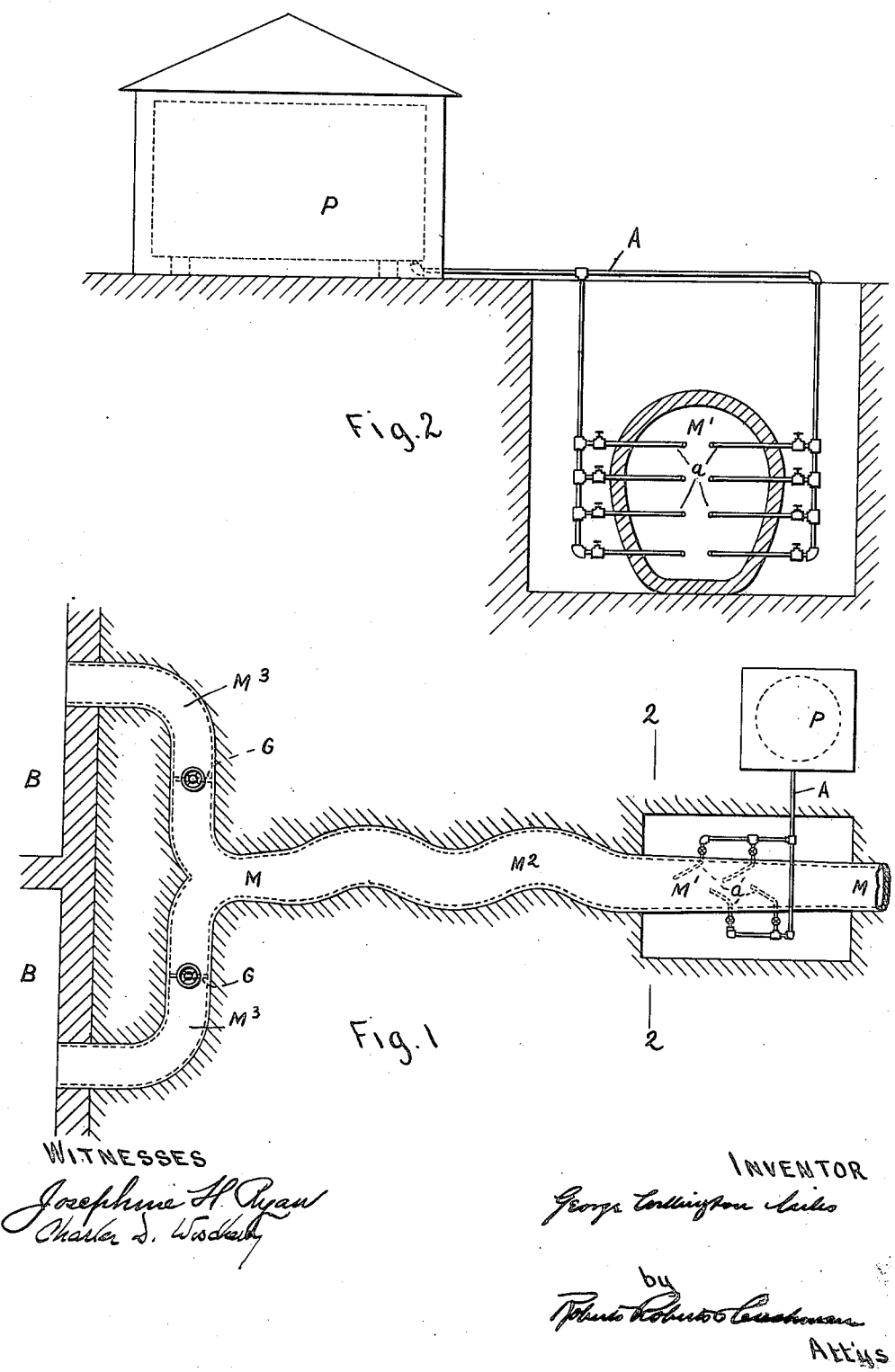

GEORGE WELLINGTON MILES, OF BELMONT, MASSACHUSETTS, ASSIGNOR TO HIMSELF, TRUSTEE.

METHOD OF PURIFYING SEWAGE AND RECOVERING ORGANIC MATTER THEREFROM.

1,134,280. Specification of Letters Patent. Patented Apr. 6, 1915.

Application filed February 16, 1914. Serial No. 818,854.

*To all whom it may concern:*

Be it known that I, GEORGE WELLINGTON MILES, a citizen of the United States, and resident of Belmont, in the county of Middlesex and State of Massachusetts, have invented new and useful Improvements in Methods of Purifying Sewage and Recovering Organic Matter Therefrom, of which the following is a specification.

My invention relates to the purification of sewage, and is addressed particularly to the treatment of sewage in large quantities, such as are delivered by modern city mains.

The object of my invention is the precipitation, deposit, retention and economical disposition of bacterial, organic, and other recoverable constituents of city sewage, so that the effluent water thereof may be discharged into streams or harbors without polluting them, or at all events, without sensibly increasing the normal and natural bacterial content of such waters. The chief difficulty presented is the enormous volume of sewage daily discharged from city mains, the relatively small percentage of the organic and bacterial contents of such sewage, and the paramount necessity for substantially continuous discharge of sewage, which must be moved to make place for the constantly accumulating sewage from the myriad source in a city.

A further object of my invention is the destruction of the comparatively trifling content of bacteria left as a residue in the effluent after the physical separation therefrom of the major portion of bacteria with the organic matter previously in suspension. Whether or not the complete elimination of bacteria from the sewage-effluent shall be accomplished by my method or by my method in that specific aspect thereof which is adapted to such complete elimination, will depend on the conditions to be met, or the preferences of those who employ the method.

Sewage from city mains contains organic and putrescible matter in solution, or it may be in colloidal suspension, in the slightly alkaline water-vehicle. This organic matter is so attenuated that the sewage itself is usually no more turbid or clouded than some pond-water or surface water. This organic matter has associated with it miscellaneous bacterial organisms, in such quantity that the modern practice of discharge sewage into streams or harbors involves a serious degree of pollution of such waters.

To clarify and render substantially bacteria-free the sewage effluent my method is applied to precipitate and flocculate the attenuated, suspended, dissolved and diffused organic matter and to allow the same to settle and deposit itself at the bottom of suitable settling basins such as are already provided in many places, as for instance the Moon Island sewage reservoirs of the system of Boston, Massachusetts; then the purified effluent, physically separated from the organic matter and bacteria associated therewith may be discharged into streams or harbors harmlessly.

In general my method consists in introducing into the moving stream of sewage in a city main, an inorganic acid, preferably sulfuric acid, at a rate predetermined by a series of tests, then thoroughly distributing the inorganic acid through the liquid body of sewage as the same proceeds through the main, while avoiding any material obstruction to the general flow, thereafter allowing the acidified sewage to stand in settling basins of adequate volume for such time as is required to allow the acid to have the effect hereinafter described. The rate at which the acid is supplied to the moving sewage should be such as will give the sewage as a whole after the action of the acid is completed, a slightly acid reaction. The inorganic acid destroys the agent which holds the organic matter in subdivision and suspension; probably this subdivision and suspension is due to the presence of alkaline protective colloids, the removal or destruction of which leaves the organic matter free to flocculate, coagulate, and then settle to the bottom of the sewage. Such alkaline protective colloids are amply accounted for by the invariable presence in city sewage of alkaline soaps and greases. When a quantity of inorganic acid sufficient to produce an acid reaction in the sewage has been added thereto, the acid reaction evidences the fact that enough acid has been supplied to perform the work of rendering the organic matter free to flocculate, and thereafter settle. As the bacteria in sewage are intimately associated with the organic matter therein, the sedimentation of the organic matter segregates the bacterial also, leaving the liquid vehicle substantially free from bacteria. By "substantially free", I mean that the bacterial content is so far reduced that it is not larger than that frequently found in acceptable drinking water; say well within one thousand to the cubic centimeter.

In the drawings hereto annexed, Figure 1 is a diagram illustrating in plan an apparatus by which my invention may be carried into effect; and Fig. 2 is a diagram in section at 2—2 of Fig. 1.

In these diagrams, which represent part of a sewage main, M and $M^2$ are sections of the main, and $M'$ another section thereof to which an acid supply pipe A, with delievery ends $a, a$, is led.

P represents a source from which acid, either liquid or gaseous, is pumped into the pipe A. The main section $M^2$ is made sinuous so that the sewage will swirl about after leaving the section $M'$, and stirred on its way to either of the settling basins B. In practice, at least two such basins will be provided with suitable means, such as gates G and branches $M^3$, for delivering the sewage into the basins alternately; an acidifying apparatus such as indicated will be installed in the sewer main leading to said branches, so that the sewage delivered to either basin shall be charged with acid. By such means as this above described, the whole body of sewage will be uniformly acidified and the acid, when the sewage comes to rest in the settling basin, will be uniformly distributed. The final sedimentation of organic matter will be complete in from six or more hours after the sewage, with inorganic acid distributed therethrough, has stood in the settling basin. The discharge of purified effluent may then take place, and should be so conducted as to avoid disturbing and redistributing the deposited precipitate, although the escape of a portion of it with the effluent will do far less harm than the sewage as originally constituted, since the precipitate will settle out of the effluent and be quite limited in distribution.

If it be desired to purify the sewage still more completely than will be the case when the above described mode is employed, I introduce into the sewage or cause to be formed therein, an inorganic acid which by reaction with the bases contained in the sewage will form acid salts, which in themselves constitute effective bactericidal agents. For example, my preferred mode of accomplishing this result is to inject into the sewage a quantity of sulfur dioxid ($SO_2$) sufficient to neutralize the normal alkalinity of the sewage and give it an acid reaction. The sulfur dioxid produces sulfurous acid ($H_2SO_3$) which like the sulfuric acid employed in the mode first above described, alters the conditions which are productive of or favorable to distribution and suspension of organic matter, and also, by reaction on the bases present, produces acid salts, such as sulfites, which in solution in the sewage destroy the bacteria remaining in the purified effluent after the sedimentation of organic matter. By this specific method the sewage-effluent can be made absolutely bacteria-free.

Whether the purifying acid be liquid or gaseous, it is to be introduced into the sewage while it is in flow through the main, so that the subsequent movement of the sewage stream may be availed of as the means for thorough distribution of the acid in the liquid mass which is so voluminous in the case of city sewage, and so attenuated, that complete admixture of acid cannot practically be effected by mechanical stirring after the sewage is collected in the settling basin. By this mode of acidifying the sewage in transit the utmost economy of acid can be obtained. Mechanical stirrers may be employed, if desired, to effect a thorough distribution of acid through the sewage.

The sedimentation of organic matter may be effected in extensions of the mains, provided these are long enough, and the flow gentle enough to allow the deposit of organic matter. Settling basins, are however, to be preferred.

The organic and bacterial matter in suspension in normal city sewage is so microscopic, so attenuated in its distribution, and so constituted as to its individual particles, as to be non-precipitant for all practical purposes. If protected from all agencies provocative of precipitation (sunlight and air, for instance) this organic matter is probably totally and persistently non-precipitant. The preliminary or preparatory action of the inorganic acid (above described) is to render precipitant this normally non-precipitant organic matter, which thereupon flocculates and precipitates from the water vehicle in a relatively short time. Since, as above stated, the inorganic acid is introduced into the sewage as it flows in the main, it has its effect on the finely divided organic matter before the latter has undergone any material degree of natural decomposition or putrefaction. Emerging from the main, normal city sewage is not offensive to any marked degree, showing that decomposition of organic matter has, to all practical intents, not set in. Decomposition, which inevitably ensues after the organic matter has been exposed for a time, destroys the organic matter as such, producing more or less offensive gases and an inorganic residue which is analogous to ash. It would be inconsistent with the economic values of the within described process as well as with its sanitary and aesthetic objects, to allow sewage to putrefy to any marked degree before rendering the organic matter precipitant in the manner described and thus conditioning it for prompt removal and recovery, because decomposition destroys the organic matter and the recoverable values in proportion to its progress, while generating offensive gases.

The organic matter in sewage has heretofore been precipitated by the addition of soluble metallic salts, such as alum or ferric sulfate, and the effluent clarified. It has also been proposed to employ an inorganic acid, such as sulfuric acid, in conjunction with such metallic salts. The presence of soluble metallic salts, either with or without an inorganic acid, while effective to cause precipitation and sedimentation of organic matter, nevertheless precipitates such matter in a condition which resists economical recovery of the grease-values, for the reason that the metallic salts, reacting on the fatty acids present in the organic matter, form insoluble soaps. These insoluble soaps increase the difficulty and expense of recovery of grease values and thus defeat any economic object, leaving only the sanitary and aesthetic purposes of sewage treatment fulfilled. My process, as distinguished from these earlier methods, is characterized by the employment of an inorganic acid as the sole effective reagent to render the organic matter precipitable, and by conditions which preclude the detrimental formation of insoluble soaps.

What I claim and desire to secure by Letters Patent is:

1. The method of purifying sewage and recovering therefrom normally non-precipitant organic matter, which consists in introducing into the sewage before decomposition of the said organic matter has materially progressed, an inorganic acid as the sole effective reagent, to render said organic matter precipitant, allowing the said organic matter, after it has become precipitant by the agency of the acid, to precipitate, and subsequently separating the cleared liquid from the precipitate.

2. The method of purifying sewage and recovering therefrom normally non-precipitant organic matter, which consists in introducing into the sewage, before decomposition of the said organic matter has materially progressed, an inorganic acid under conditions which preclude the formation of insoluble soaps, to render said organic matter precipitant, allowing the said organic matter, after it has become precipitant by the agency of said acid, to precipitate, and subsequently separating the cleared liquid from the precipitate.

3. The method of purifying sewage and recovering therefrom normally non-precipitant organic matter, which consists in introducing sulfurous acid into the sewage before decomposition of the said organic matter has materially progressed, thereby rendering precipitant the said organic matter, and subsequently separating the cleared liquid from the precipitate.

4. The method of purifying sewage and recovering therefrom normally non-precipitant organic matter, which consists in introducing sulfurdioxid into the sewage before decomposition of the said organic matter has materially progressed, thereby producing sulfurous acid, rendering precipitant the said organic matter, and subsequently separating the cleared liquid from the precipitate.

Signed by me at Boston, Massachusetts, this ninth (9) day of February 1914.

GEORGE WELLINGTON MILES.

Witnesses:
ODIN ROBERTS,
G. WRIGHT ARNOLD.